US010612592B2

(12) United States Patent
El-Shafei

(10) Patent No.: US 10,612,592 B2
(45) Date of Patent: Apr. 7, 2020

(54) INTEGRATED JOURNAL BEARING

(71) Applicant: Aly El-Shafei, Cairo (EG)

(72) Inventor: Aly El-Shafei, Cairo (EG)

(*) Notice: Subject to any disclaimer, the term of this patent is extended or adjusted under 35 U.S.C. 154(b) by 251 days.

(21) Appl. No.: 15/597,628

(22) Filed: May 17, 2017

(65) Prior Publication Data

US 2017/0335888 A1 Nov. 23, 2017

Related U.S. Application Data

(60) Provisional application No. 62/337,555, filed on May 17, 2016.

(51) Int. Cl.
| | |
|---|---|
| *F16C 32/04* | (2006.01) |
| *F16C 17/24* | (2006.01) |
| *F16C 17/02* | (2006.01) |
| *F16C 17/20* | (2006.01) |
| *F16C 33/10* | (2006.01) |
| *H02K 7/09* | (2006.01) |

(52) U.S. Cl.
CPC ........ *F16C 32/0402* (2013.01); *F16C 17/022* (2013.01); *F16C 17/20* (2013.01); *F16C 17/24* (2013.01); *F16C 32/048* (2013.01); *F16C 32/0451* (2013.01); *F16C 33/1025* (2013.01); *H02K 7/09* (2013.01); *F16C 2240/46* (2013.01)

(58) Field of Classification Search
CPC ..... H02K 7/09; F16C 32/0402; F16C 32/044; F16C 32/0442; F16C 32/0444; F16C 32/0451; F16C 32/048; F16C 17/022; F16C 17/20; F16C 17/24; F16C 33/1025; F16C 2240/46

USPC ....................................................... 310/90.5
See application file for complete search history.

(56) References Cited

U.S. PATENT DOCUMENTS

| | | | |
|---|---|---|---|
| 3,969,804 | A | 7/1976 | MacInnes et al. |
| 4,034,228 | A | 7/1977 | Arauner |
| 4,300,808 | A | 11/1981 | Yoshioka |
| 4,415,281 | A | 11/1983 | Agrawal |
| 4,488,826 | A | 12/1984 | Thompson |
| 4,526,483 | A | 7/1985 | Hishikawa et al. |

(Continued)

OTHER PUBLICATIONS

El-Shafei et al., Controlling Journal Bearing Instability Using Active Magnetic Bearings, Journal of Engineering for Gas Turbines and Power, Jan. 2010, vol. 132.

(Continued)

*Primary Examiner* — Michael Andrews
(74) *Attorney, Agent, or Firm* — Allen Dyer Doppelt & Gilchrist

(57) ABSTRACT

An integrated journal bearing (IJB) includes a shaft extending in an axial direction, a housing through which the shaft extends in the axial direction, the housing surrounding the shaft in a radial direction, an active magnetic bearing (AMB) arranged within the housing and surrounding the shaft in the radial direction, and at least a first fluid film journal bearing (JB) arranged within the housing and surrounding the shaft in the radial direction. The first JB is axially adjacent to the AMB such that first JB and the AMB do not share a common radial clearance, while both are commonly flooded with oil. A controller in signal communication with the AMB can be variously configured to supply current thereto to operate the AMB by controlling a magnetic force generated thereby.

19 Claims, 7 Drawing Sheets

(56) References Cited

U.S. PATENT DOCUMENTS

| | | |
|---|---|---|
| 4,597,676 A | 7/1986 | Vohr et al. |
| 4,767,223 A | 8/1988 | Goodwin |
| 4,827,169 A * | 5/1989 | Habermann ............ F16C 17/02 |
| | | 310/90.5 |
| 4,828,403 A | 5/1989 | Schwartzman |
| 4,880,320 A | 11/1989 | Haines et al. |
| 4,961,122 A | 10/1990 | Sakai et al. |
| 5,032,028 A | 7/1991 | Riazuelo et al. |
| 5,096,309 A | 3/1992 | Nakasugi et al. |
| 5,142,177 A * | 8/1992 | Higuchi ................ F16C 27/00 |
| | | 310/51 |
| 5,201,585 A | 4/1993 | Gans et al. |
| 5,322,371 A | 7/1994 | Signoret et al. |
| 5,480,234 A | 1/1996 | Chen et al. |
| 5,489,155 A | 2/1996 | Ide |
| 5,516,212 A | 5/1996 | Titcomb |
| 5,531,523 A | 7/1996 | Subbiah |
| 5,549,392 A | 8/1996 | Anderson |
| 5,634,723 A | 6/1997 | Agrawal |
| 5,743,654 A | 4/1998 | Ide et al. |
| 5,743,657 A | 4/1998 | O'Reilly et al. |
| 5,772,334 A | 6/1998 | Parkins et al. |
| 5,795,076 A | 8/1998 | Ball et al. |
| 5,879,085 A | 3/1999 | Ball et al. |
| 6,089,756 A | 7/2000 | Ono et al. |
| 6,353,273 B1 * | 3/2002 | Heshmat ............... F16C 17/024 |
| | | 310/90.5 |
| 6,606,536 B1 | 8/2003 | Aso |
| 6,653,756 B2 | 11/2003 | Ueyama et al. |
| 6,703,736 B2 | 3/2004 | Wang et al. |
| 6,707,200 B2 | 3/2004 | Carroll et al. |
| 6,717,311 B2 | 4/2004 | Locke |
| 6,720,695 B2 | 4/2004 | Coenen |
| 6,727,617 B2 | 4/2004 | McMullen et al. |
| 6,737,777 B2 | 5/2004 | Werfel et al. |
| 7,836,601 B2 | 11/2010 | El-Shafei |
| 2008/0224556 A1 | 9/2008 | El-Shafei |
| 2016/0053807 A1 | 2/2016 | Maciver et al. |

OTHER PUBLICATIONS

Dimitri et al., Instability Control and Unbalance Compensation of Flexible Rotors Supported on Journal Bearings Using Magnetic Bearings, Proceedings of the 8th IFToMM International Conference on Rotordynamics, Sep. 12-15, 2010, KIST, Seoul, Korea.

El-Hakim et al., Numerical and Experimental Identification of the Static Characteristics of a Combined Journal-Magnetic Bearing: Smart Integrated Bearing, Proceedings of the 10th International Conference on Vibratoins in Rotating Machinery, IMechE, London, UK, pp. 399-407, Sep. 11-13, 2012.

El-Shafei et al., Test Rig Characterization and Dynamic Testing of a Smart Electro-Magnetic Actuator Journal Integrated Bearing, Mechanisms and Machine Science vol. 21, Springer-Verlag Berlin Heidelberg, 2011, Proceedings of the 9th IFToMM International Conference on Rotodynamics, Sep. 22-25, 2014, Milan, Italy.

Dimitri et al., Oil Whip Elimination Using Fuzzy Logic Controller, Journal of Engineering for Gas Turbines and Power, Jun. 2016, vol. 138, No. 6.

Dimitri et al., Magnetic Actuator Control of Oil Whip Instability in Bearings, IEEE Transactions on Magnetics, vol. 51, No. 11, Nov. 2015.

El-Shafei et al., PD Control of a Smart Electro-Magnetic Actuator Journal Integrated Bearing (SEMAJIB), Proceedings of the 11th IMechE International Conference on Vibrations in Rotating Machinery, Manchester, UK, Sep. 2016, Paper C1030, pp. 239-250.

PCT International Searching Authority; International Search Report and Written Opinion dated Sep. 28, 2017; entire document.

* cited by examiner

INTEGRATED JOURNAL BEARING

CROSS-REFERENCE TO RELATED APPLICATION

This application claims the benefit of U.S. Provisional Patent Application Ser. No. 62/337,555, filed on May 17, 2016, the contents of which are herein incorporated by reference in their entirety.

FIELD OF THE INVENTION

The present invention relates to journal bearings, and more particularly, to journal bearings integrating both fluid film and magnetic load carrying elements.

BACKGROUND OF THE INVENTION

Fluid Film Bearings (FFBs) and Active Magnetic Bearings (AMBs) are competing devices in the marketplace. FFBs, in particular Journal Bearings (JBs), are superior load carrying elements due to their larger load carrying capacity and their ability to introduce passive damping to the rotor system. However, JBs exhibit an unstable vibration at high speed, called oil whip, which is excited when the rotor speed reaches about twice the first critical speed. This instability limits the possibility of increasing the rotor speed of rotation.

AMBs, on the other hand, provide contactless rotor support, at high speeds and are free from whip instabilities. They have an added feature which is their capabilities as controlling elements. AMBs can provide variable and controllable stiffness and damping and additionally can provide unbalance control and many other control features. However, AMBs suffer from certain shortcomings. In particular reliability issues are always a concern for AMB designers. In fact, AMBs are always designed with a redundant bearing system, called a "backup bearing", such that the backup bearing carries the rotor in case of AMB failure.

SUMMARY OF THE INVENTION

The present invention provides a smart high performance integrated bearing that combines a fluid film bearing (FFB) with an electro-magnetic actuator (EMA) in one integrated device. In all cases, the fluid film bearing shall carry the load, whereas the electro-magnetic actuator can be used as a pure controller or both as a controller and a load carrying element. In the latter case the electro-magnetic actuator can be considered as an active magnetic bearing (AMB).

The integration of AMBs and JBs in one device, referring to herein as an integrated journal bearing (IJB), has clear advantages. The IJB has all of the advantages of JBs and AMBs, and avoids all of the shortcomings of AMBs and JBs. The IJB is a superior load carrying element due to its larger load carrying capacity and its ability to introduce passive damping to the rotor system. Moreover, it is free from whip instabilities and has capabilities as a controller. An IJB can provide variable and controllable stiffness and damping and additionally can provide unbalance control and many other control features. Most importantly, there is no need for a backup bearing as the rotor is carried on the JB in all cases.

It is thus a general object of this invention to provide an improved bearing for rotating machines.

It is a further object of this invention to provide a fluid film bearing integrated with an electro-magnetic actuator confined in one space.

It is another object of this invention to provide a fluid film bearing integrated with an electro-magnetic actuator confined in one space filled with oil.

It is still another object of this invention to provide an electro-magnetic actuator within the integrated bearing that acts as an active magnetic bearing.

It is yet another object of this invention to provide an active magnetic bearing within the integrated bearing that may or may not carry a load.

It is a particular object of this invention to provide a superior load carrying element.

It is an additional object of this invention to provide a load carrying element with superior load carrying capacity.

It is another object of this invention to provide a load carrying element that can introduce passive damping to the rotor system.

It is a yet another object of this invention to provide a load carrying element that is free from whip instabilities.

It is a still another object of this invention to provide a load carrying element that can act as a controller.

It is a further object of this invention to provide a load carrying element that can provide a variable and controllable stiffness and damping.

It is an additional object of this invention to provide a load carrying element that can provide unbalance control.

It is an additional object of this invention to provide a load carrying element that can provide many active control features.

It is still an additional object of this invention to provide a superior load carrying element that can provide all the above features without the need for a backup bearing.

Advantageously, an integrated journal bearing according to the present invention may simultaneously achieve all the above objectives.

In a preferred embodiment, the magnetic bearing surrounds a laminated rotor and maintains its own suitable clearance. Two journals (possibly with the same diameter as the laminated rotor) are assembled on each side of the AMB and maintain the rotor laminations in place. The two JBs are installed over the two journals, with their own particular clearance. Oil conduits introduce oil into the two JBs, which is allowed to flow freely into the AMB space. Oil seals are used to seal the oil flow outside the integrated bearing.

This embodiment achieves the required objectives in a unique way. To maintain symmetry, two journal bearings surround an AMB in one confined space. Oil is introduced in the confined space thus flooding both the AMB and the FFB. A controller is then used to control the AMB to achieve the required performance.

In another embodiment only one FFB and one AMB is used. In this embodiment the magnetic bearing surrounds a laminated rotor and maintains its own suitable clearance. A journal (possibly with the same diameter as the laminated rotor) is assembled beside the AMB and maintains the rotor laminations in place. The JB is installed over the journal, with its own particular clearance. Oil conduits introduce oil into the JB, which is allowed to flow freely into the AMB space. Oil seals are used to seal the oil flow outside the integrated bearing.

Other possible embodiments with two AMBs and one FFB are possible, and people skilled in the art can clearly select the most suitable embodiment for the particular application at hand.

It should be clear that for the purposes of this application it does not matter whether the FFB is a JB or an elliptic bearing, or a pressure dam bearing or a multi-lobe bearing or even a tilting-pad bearing. Similarly it does not matter whether the AMB is a load-carrying AMB or just an EMA. The particular design and the field of application shall dictate the type of FFB and AMB used.

The inventor in his invention of U.S. Pat. No. 7,836,601 in 2010 revealed the possibility of integrating FFBs with AMBs in one device. This was a major breakthrough. Up to that date, no one in his right mind would consider adding oil to a magnetic bearing. In fact, promoters of AMBs hailed them as "oil-free" devices, claiming this as one of their advantages. U.S. Pat. No. 7,836,601 was a paradigm shift in thinking where oil is introduced into an AMB.

The specifications of U.S. Pat. No. 7,836,601 explain that the integrated bearing can have the form of one integral bearing having the fluid film bearing within the magnetic bearing, such that the fluid for the fluid film bearing passes over the rotor of the magnetic bearing, and within the clearance between the rotor and stator in the magnetic bearing.

However, in this case a design issue will appear, since the magnetic bearing will require a large clearance to dissipate generated heat, and the fluid film bearing will require small clearance to improve load carrying capacity. This design issue can be tackled in two ways, one is to select a compromise clearance between the two conflicting requirements, and the other is to use a small clearance for loading in the fluid film bearing, and use an increased fluid low to dissipate the generated heat in the magnetic bearing.

Similar to U.S. Pat. No. 7,836,601, this application considers the FFB and the AMB as an integrated bearing, but contrary to U.S. Pat. No. 7,836,601 the FFB and the AMB do not share the same clearance. In this invention the integrated bearing consists of an AMB and an FFB that are integrated in one device but do not share a clearance. However both the AMB and the FFB are flooded in oil.

U.S. Pat. No. 7,836,601 reveals that the invention actually relies on the advantages and shortcomings of both devices. The invention is to use a fluid film bearing (whether it is a cylindrical journal bearing, an elliptic bearing, an offset-half bearing, a multi-lobe bearing, or a tilting-pad bearing, does not really matter) as a primary load carrying bearing, and to use a magnetic bearing in combination with the fluid film bearing to control the instability. This should be quite an efficient combination, where the combination results in bearings that can be used at high speeds without having neither stability nor reliability problems.

Moreover U.S. Pat. No. 7,836,601 refers to many patents that cover magnetic bearings, e.g.,
U.S. Pat. No. 6,737,777 Magnetic bearing and use thereof;
U.S. Pat. No. 6,727,617 Method and apparatus for providing three axis magnetic bearing having permanent magnets mounted on radial pole stock;
U.S. Pat. No. 6,720,695 Rotor spinning device with a contact less, passive, radial bearing for the spinning rotor;
U.S. Pat. No. 6,717,311 Combination magnetic radial and thrust bearing;
U.S. Pat. No. 6,707,200 Integrated magnetic bearing;
U.S. Pat. No. 6,703,736 Magnetic bearing;
U.S. Pat. No. 6,653,756 Magnetic bearing device; and
U.S. Pat. No. 6,606,536 Magnetic bearing device and magnetic bearing control device.

However, none of these patents discuss the use of magnetic bearings as a means of controlling journal bearings instability. Actually, most of the state-of-the-art, and the current development efforts in magnetic bearings, are for the use of magnetic bearings as a primary load carrying element, and to use the excess control action to provide some desirable stability benefits in rotating machines Also, U.S. Pat. No. 7,836,601 refers to many patents that cover fluid film bearings, e.g.,
U.S. Pat. No. 6,089,756 Plain bearing;
U.S. Pat. No. 5,879,085 Tilt pad hydrodynamic bearing for rotating machinery;
U.S. Pat. No. 5,795,076 Tilt pad hydrodynamic bearing for rotating machinery;
U.S. Pat. No. 5,772,334 Fluid film bearings;
U.S. Pat. No. 5,743,657 Tilting pad journal bearing;
U.S. Pat. No. 5,743,654 Hydrostatic and active control movable pad bearing;
U.S. Pat. No. 5,634,723 Hydrodynamic fluid film bearings;
U.S. Pat. No. 5,549,392 Shaft seal for hydrodynamic bearing unit;
U.S. Pat. No. 5,531,523 Rotor journal bearing having adjustable bearing pads;
U.S. Pat. No. 5,516,212 Hydrodynamic bearing with controlled lubricant pressure distribution;
U.S. Pat. No. 5,489,155 Tilt pad variable geometry bearings, having tilting bearing pads and methods of making same;
U.S. Pat. No. 5,480,234 Journal bearing;
U.S. Pat. No. 5,322,371 Fluid film bearing;
U.S. Pat. No. 5,201,585 Fluid film journal bearing with squeeze film damper for turbo machinery;
U.S. Pat. No. 5,096,309 Hydrodynamic bearing system;
U.S. Pat. No. 5,032,028 Fluid film bearing;
U.S. Pat. No. 4,961,122 Hydrodynamic grooved bearing device;
U.S. Pat. No. 4,828,403 Resiliently mounted fluid bearing assembly;
U.S. Pat. No. 4,880,320 Fluid film journal bearings;
U.S. Pat. No. 4,767,223 Hydrodynamic journal bearings;
U.S. Pat. No. 4,597,676 Hybrid bearing;
U.S. Pat. No. 4,526,483 Fluid foil bearing;
U.S. Pat. No. 4,415,281 Hydrodynamic fluid film bearing;
U.S. Pat. No. 4,300,808 Tilting-pad bearings;
U.S. Pat. No. 4,034,228 Tilting pad bearing; and
U.S. Pat. No. 3,969,804 Bearing housing assembly method for high speed rotating shafts.

However, none of these patents suggest the use of magnetic bearings as a means of controlling fluid film instabilities.

Actually, the development of magnetic bearings and the development of fluid film bearings are two completely separate items, and investigators in both areas do not appreciate the developments in the other area, as if they are two different islands.

U.S. Pat. No. 6,353,273, Hybrid foil-magnetic bearing is an exception. In that invention, it is suggested that both the foil bearing and the magnetic bearing are used as load carrying elements. It is possible to do so to carry large load, such that each of the foil bearing and the magnetic bearing carry part of the load. However, in the opinion of this inventor, that is not a good solution. The hybrid foil-magnetic bearing, although capable of operating at high speeds, still suffers from the same disadvantages of magnetic bearings.

Although fluid film bearings and magnetic bearings are well known devices, yet it is not obvious that they can be used in a combined form, since the current technology is that these are competing devices not complementing devices. Both are considered load carrying devices that have certain control capabilities (passive control for fluid film bearings and active control for magnetic bearings). It is thus an invention to consider the magnetic bearing only as a controlling device, and the fluid film bearing as only a load carrying device. Their combined effect is to have bearings with the advantages of large load carrying capacity, excellent reliability, and use at high speeds without instability, in addition to all the known advantages of fluid film bearings and magnetic bearings. Moreover, an additional advantage will appear, since the magnetic bearing is not used as a load carrying element, the power requirements will be reduced, and thus smaller, lighter magnetic bearings can be used that can control the rotor vibrations reliably.

DETAILED DESCRIPTION OF THE INVENTION

This invention is a smart high performance integrated bearing that combines a fluid film bearing (FFB) with an electro-magnetic actuator (EMA) in one integrated device. In all cases, the fluid film bearing shall carry the load, whereas the electro-magnetic actuator can be used as a pure controller or both as a controller and a load carrying element. In the latter case the electro-magnetic actuator can be considered as an active magnetic bearing (AMB).

The integration of AMBs and JBs in one device, the integrated journal bearing (IJB), has clear advantages. The IJB has all of the advantages of JBs and AMBs, and avoids all of the shortcomings of AMBs and JBs. The IJB is a superior load carrying element due to its larger load carrying capacity and its ability to introduce passive damping to the rotor system. Moreover, it is free from whip instabilities and has capabilities as a controller. An IJB can provide variable and controllable stiffness and damping and additionally can provide unbalance control and many other control features. Most importantly, there is no need for a backup bearing as the rotor is carried on the JB in all cases.

Figure 1:
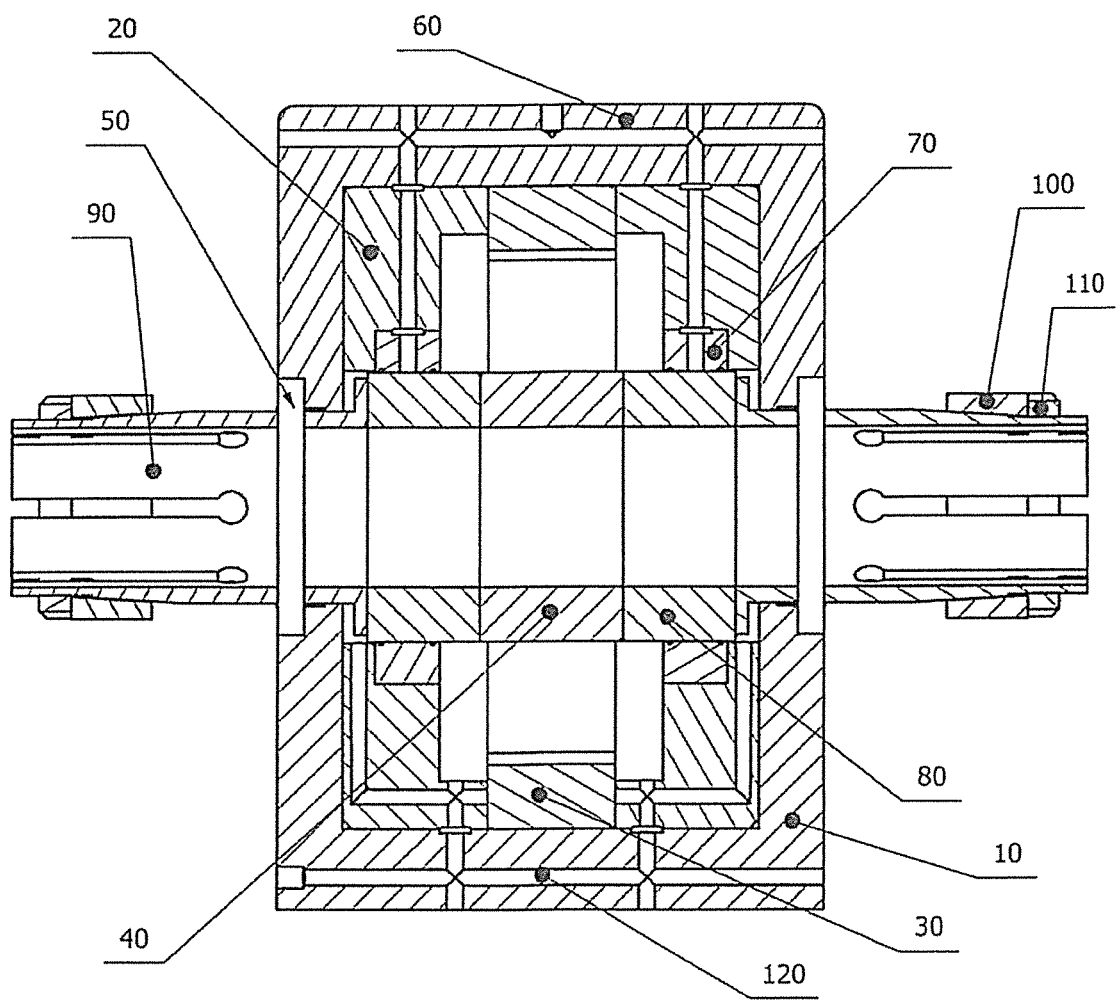
FIG. 1 is a cross-section elevation view of one embodiment of the invention depicting the integrated-journal bearing where the magnetic bearing surrounds a laminated rotor and maintains its own suitable clearance. Two journals (possibly with the same diameter as the laminated rotor) are assembled on each side of the AMB and maintain the rotor laminations in place.
Figure 2:
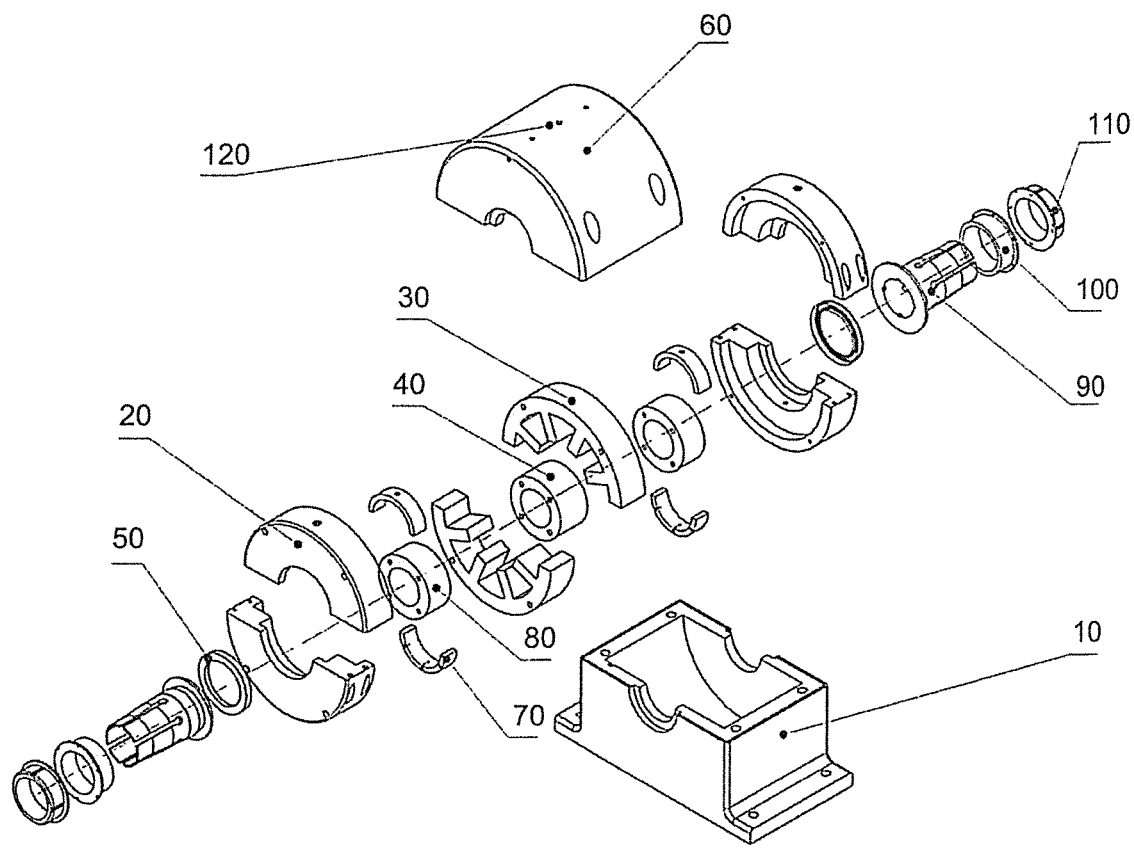
FIG. 2 is an exploded view of the embodiment shown in FIG. 1 showing the details of the components. This is the embodiment built and tested by the inventor.

FIG. 1 and FIG. 2 show a preferred embodiment of the IJB. In this embodiment the AMB rotor laminations 40 are mounted on the shaft, while the outer laminations 30 are held in place by the IJB lower housing 10 and upper housing 60. The clearance of the AMB is actually the clearance between the rotor laminations 40 and the outer laminations 30. Two journal bearing sleeves 80 are placed on the rotor on both sides of the rotor laminations 40. The journal bearing lining 70 is held in place surrounding the sleeve 80 by the journal bearing housing 20 held in place by the IJB lower housing 10 and upper housing 60. The journal bearing clearance is between the sleeve 80 and the lining 70. Oil is fed and drained through the conduits 120, and submerges both the journal bearing and the AMB cavities. Seals 50 prevent the oil from escaping the cavity. Two holding sleeves 90 are used to hold the bearing sleeves 80 in place on the shaft. A fixing adapter 100 is locked in place by a fixing nut 110 on each holding sleeve 90.

Figure 3:
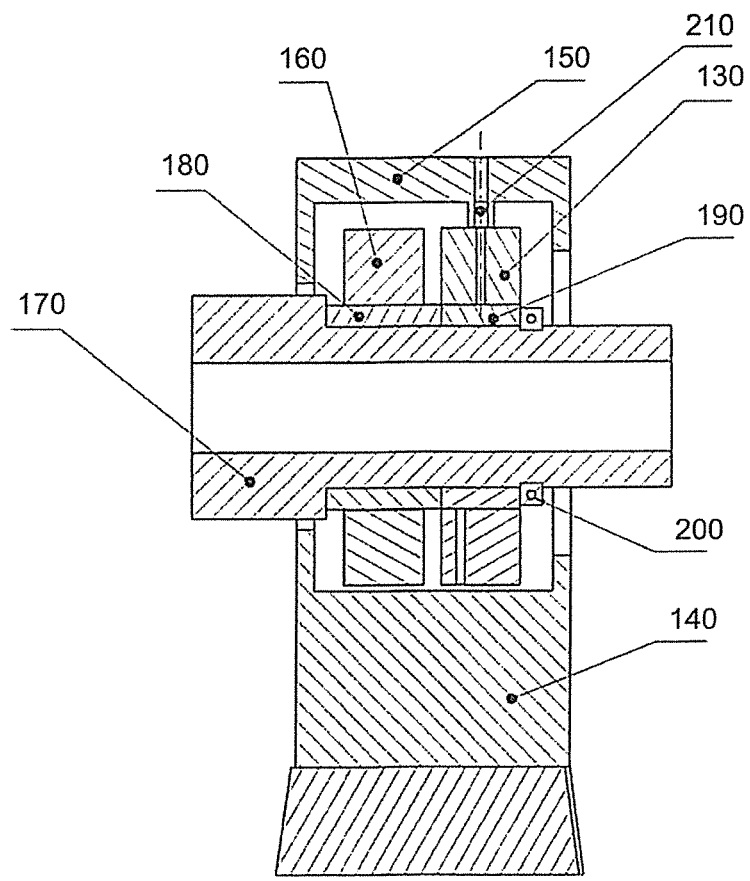
FIG. 3 is a cross-section elevation view of another embodiment of the invention depicting the integrated-journal bearing where the magnetic bearing surrounds a laminated rotor and maintains its own suitable clearance and a journal is assembled adjacent to the AMB and maintains the rotor laminations in place.
Figure 4:
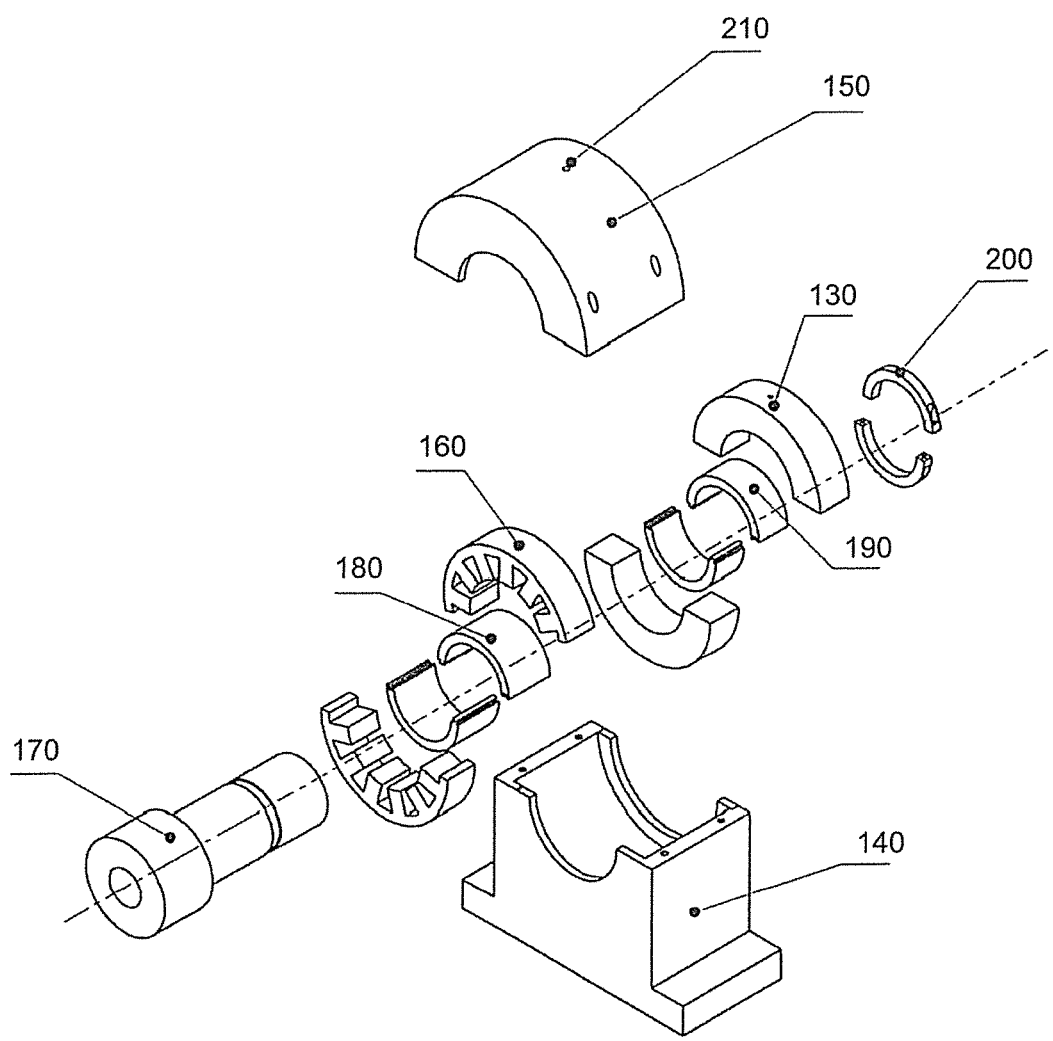
FIG. 4 is an exploded view of the embodiment shown in FIG. 3 showing the details of the components.

FIG. 3 and FIG. 4 show another embodiment of the IJB. In this embodiment the AMB rotor laminations 180 are mounted on the shaft, while the outer laminations 160 are held in place by the IJB lower housing 140 and upper housing 150. The clearance of the AMB is actually the clearance between the rotor laminations 180 and the outer laminations 160. One journal bearing sleeve 190 is placed on the rotor beside the rotor laminations 180. The journal bearing lining 130 is held in place surrounding the sleeve 190 by the IJB lower housing 140 and upper housing 150. The journal bearing clearance is between the sleeve 190 and the lining 130. Oil is fed and drained through the conduits 210, and submerges both the journal bearing and the AMB cavities. The clamp 200 is used to hold the bearing sleeve 190 in place on the shaft. It should be noted that this embodiment is suitable for shafts with shoulders as shown in FIG. 3, where the rotor laminations 180 are resting against the shaft shoulder and kept in place by the journal sleeve 190, which in turn is held in place by clamp 200.

Figure 5:
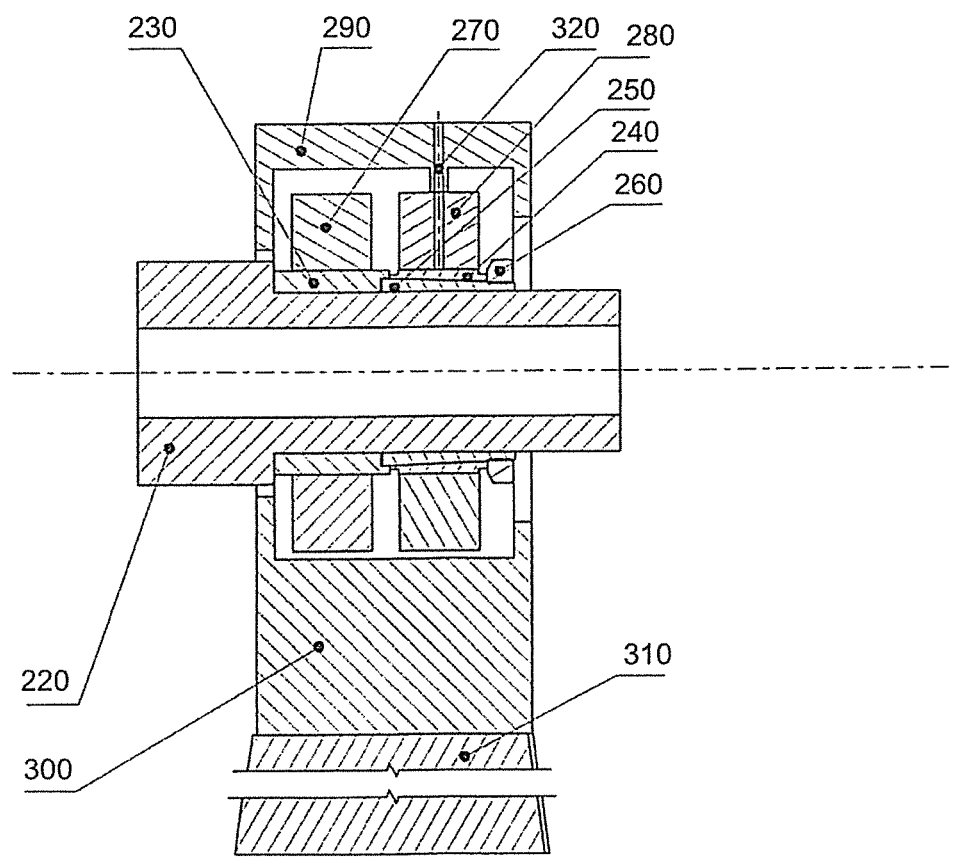
FIG. 5 is a cross-section elevation view of yet another embodiment of the invention depicting the integrated-journal bearing where the magnetic bearing surrounds a laminated rotor and maintains its own suitable clearance and a journal is assembled adjacent to the AMB and maintains the rotor laminations in place with an alternative fixation.
Figure 6:
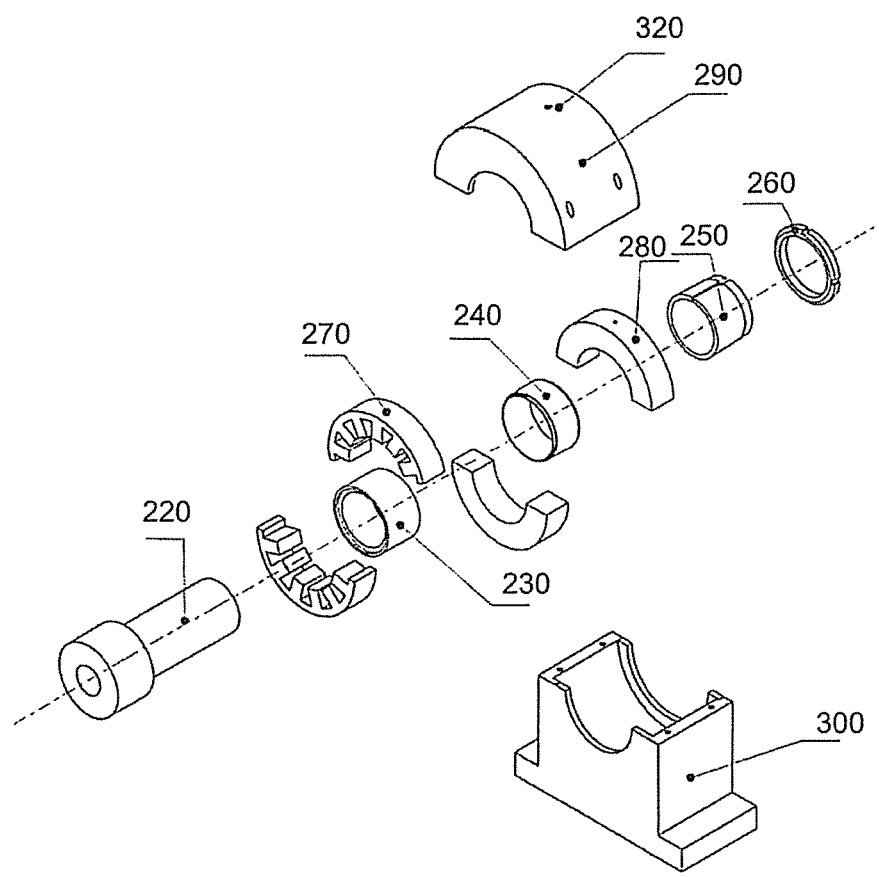
FIG. 6 is an exploded view of the embodiment shown in FIG. 5 showing the details of the components.

The same embodiment is shown in FIG. 5 and FIG. 6, but with a different fixing method for the rotor laminations and journal sleeve. In FIG. 5 and FIG. 6 the AMB rotor laminations 230 are mounted on the shaft, while the outer laminations 270 are held in place by the IJB lower housing 300 and upper housing 290. The clearance of the AMB is actually the clearance between the rotor laminations 230 and the outer laminations 270. A holder sleeve 250 is used to hold the rotor laminations 270. The journal bearing sleeve 240 is inserted on the holder sleeve 250 and kept in place by locking nut 260. The journal bearing lining 280 is held in place surrounding the sleeve 240 by the IJB lower housing 300 and upper housing 290. The journal bearing clearance is between the sleeve 240 and the lining 280. Oil is fed and drained through the conduits 320, and submerges both the journal bearing and the AMB cavities. This embodiment is also suitable for shafts with shoulders as shown in FIG. 5, where the rotor laminations 230 are resting against the shaft shoulder and kept in place the holder sleeve 250 and locking nut 260.

Figure 7:
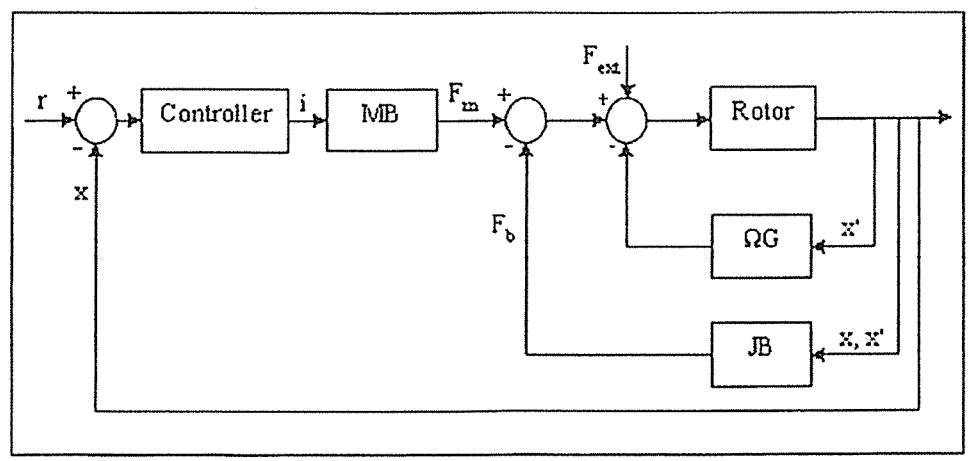
FIG. 7 shows the basic control circuit used to control the active magnetic bearing with feedback from the rotor states and including journal bearing characteristics.

FIG. 7 shows a block diagram of the IJB system. The rotor is subjected to external forces $F_{ext}$, however the rotor states x and x' affect the JB which in turn provide a bearing force $F_b$ that is added to the magnetic bearing force $F_m$. The feedback states x and x' are electronically directed to a programmable controller that provides a current through a power amplifier to the AMB thus producing the magnetic force $F_m$.

The inventor has applied many control algorithms similar to the block diagram in FIG. 7. In reference 2, the inventor and his students discuss controlling oil whip using the IJB through multiple algorithms and show that damping control is an effective method for controlling the IJB, while in reference 3, instability control and unbalance control using the IJB are introduced. Reference 4 is an important contribution which shows that oil does not adversely affect the performance of AMBs. In fact it is shown that oil in an AMB actually provides some minor improvements in AMB performance. Reference 5 introduces the testing of a rotor on one IJB and one rolling element bearing using PID control, while reference 6 introduces fuzzy logic control to the IJB, and reference 7 introduces H∞ control to the IJB and discusses load sharing between the AMB and the JB. Reference 8 introduces testing of a rotor on two IJB bearings and the ability to transgress the oil whip instability for the first mode and the second mode by applying PD control. In fact reference 8 is a clear indication of the success of the IJB. It shows that the IJB can carry a high load rotor at high speeds and with ability to control multiple instabilities.

In all of the above experiments an off-the-shelf programmable controller is used. The control algorithms discussed in the previous paragraph were all implemented experimentally, and were quite successful. The choice of the control algorithm is a matter of choice for each application. In many cases, it is important to instruct the magnetic bearing not to interfere with the load carrying by the JB. In fact the H∞ controller introduced in reference 7 actually tends to carry some of the load on the AMB, while the PD controller tends to act as a controller only. The problem is that the AMB likes to center the rotor, while the JB tends to move the rotor center downwards and sideways. These two competing devices need a controller designed to carry the load on the JB and keep all the AMB power for control. Only in special circumstances (like relocating resonances) should the AMB be allowed to carry the load. The references mentioned above provide ample examples of the controller application. However, a person skilled in the art can judiciously select the appropriate control algorithm. It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

REFERENCES

1) El-Shafei, A., 2010, "Methods of Controlling the Instability in Fluid Film Bearings", U.S. Pat. No. 7,836,601.
2) El-Shafei, A., and Dimitri, A. S., 2010, "Controlling Journal Bearing Instability Using Active Magnetic Bearing", ASME Trans., Journal of Engineering for Gas Turbine and Power, Vol. 132 January, No. 1.
3) Dimitri, A. S., and El-Shafei, A., 2010, "Instability Control and Unbalance Compensation of Flexible Rotors Supported on Journal Bearings Using Magnetic Bearings", Proceedings of the 8th IFToMM International Conference on Rotordynamics September 12-15, KIST, Seoul, Korea.
4) El-Hakim, M., Dimitri, A. S, Sakr, T., Mahfoud, J., Adly, A. A., and El-Shafei, A., 2012, "Numerical and experimental identification of a combined Journal-Magnetic bearing: Smart Integrated Bearing," Proceedings of the 10th International Conference on Vibrations in Rotating Machinery, IMechE, London UK, p. 399-407, 11-13 September
5) El-Shafei, A., Dimitri, A. S., Saqr, T., and El-Hakim, M., "Test Rig Characterization and Dynamic Testing of a Smart Electro-Magnetic Actuator Journal Integrated Bearing", Proc. 9th IFToMM Int. Conf. on Rotordynamics, September 22-25, Milan, Italy, 2014. Mechanisms and Machine Science Vol. 21, Springer.
6) Dimitri, A. S., Mahfoud, J. and El-Shafei, A., 2015, "Oil Whip Elimination using Fuzzy Controller", J. Eng. Gas Turbines Power, Vol. 138, No. 6.
7) Dimitri, A. S., El-Shafei, A., Adly, A. A., Mahfoud, J., 2015, "Magnetic Actuator Control of Oil Whip Instability in Bearings" IEEE Transactions on Magnetics, Vol. 51, No. 11.
8) El-Shafei, A., Dimitri, A. S., and Mahfoud, J., 2016, "PD Control of a Smart Electro-Magnetic Actuator Journal Integrated Bearing (IJB)" Proceedings the $11^{th}$ IMechE International Conference on Vibrations in Rotating Machinery, Manchester, UK, September 2016, paper C1030, pp. 239-250.

What is claimed is:

1. An integrated journal bearing comprising:
a shaft extending in an axial direction;
a housing through which the shaft extends in the axial direction, the housing surrounding the shaft in a radial direction;
an electro-magnetic actuator arranged within the housing and surrounding the shaft in the radial direction, the electro-magnetic actuator including rotor laminations mounted to the shaft and outer laminations arranged in the housing, a radial electro-magnetic actuator clearance being located between the rotor laminations and the outer laminations;
at least a first fluid film journal bearing arranged within the housing and surrounding the shaft in the radial direction, the first journal bearing including a first journal bearing sleeve mounted to the shaft axially adjacent to the rotor laminations and a first JB lining arranged in the housing, a radial first journal bearing clearance being located between the first journal bearing sleeve and lining; and
wherein oil conduits are defined through the housing configured to feed and drain oil through both the electro-magnetic actuator and first journal bearing clearances; and
wherein the first journal bearing lining does not extend axially into the radial electro-magnetic actuator clearance between the rotor laminations and the outer laminations.

2. The integrated journal bearing of claim 1, further comprising a second journal bearing arranged within the housing and surrounding the shaft in the radial direction, the second journal bearing including a second journal bearing sleeve mounted to the shaft axially adjacent to an opposite side of the rotor laminations from the first journal bearing sleeve and a second journal bearing lining arranged in the housing, a radial second journal bearing clearance being located between the second journal bearing sleeve and lining;
wherein the oil conduits are further configured to feed and drain oil through the second journal bearing clearance.

3. The integrated journal bearing of claim 2, further comprising first and second holding sleeves mounted to the rotor axially outward of the first and second journal bearings, respectively.

4. The integrated journal bearing of claim 3, further comprising first and second seals mounted to the rotor, the first seal being located axially between the first journal bearing and the first holding sleeve, the second seal being located axially between the second journal bearing and the second holding sleeve, the first and second seals being configured to prevent oil from escaping between the shaft and the housing.

5. The integrated journal bearing of claim 3, further comprising first and second fixing adapters surrounding the first and second holding sleeves, respectively, the first and second fixing adapters being locked in place by first and second fixing nuts, respectively.

6. The integrated journal bearing of claim 1, wherein the shaft includes a shoulder extending outward in the radial direction, a side of the rotor laminations opposite the first a-journal bearing sleeve being axially adjacent to the shoulder.

7. The integrated journal bearing of claim 6, further comprising a clamp mounted to the shaft axially adjacent to a side of the first journal bearing sleeve opposite the rotor laminations.

8. The integrated journal bearing of claim 6, further comprising a holder sleeve mounted on the shaft, the holder sleeve being located radially between the shaft and the first journal bearing sleeve and axially adjacent to the same side of the rotor laminations as the first journal bearing sleeve.

9. The integrated journal bearing of claim 8, further comprising a locking nut connected to the holder sleeve axially adjacent to a side of the first journal bearing sleeve opposite the rotor laminations.

10. The integrated journal bearing of claim 1, further comprising a controller in signal communication with the electro-magnetic actuator and configured to supply current thereto to operate the electro-magnetic actuator by controlling a magnetic force generated thereby.

11. The integrated journal bearing of claim 10, wherein the controller is configured to operate the electro-magnetic actuator to carry bearing load in addition to the journal bearing under at least some shaft conditions, such that the electro-magnetic actuator functions as an active magnetic bearing.

12. The integrated journal bearing of claim 11, wherein the controller is configured to receive feedback of external forces applied to the shaft during different states thereof and adjust the magnetic force in response thereto.

13. The integrated journal bearing of claim 12, wherein the controller is configured to control the magnetic force generated by the active magnetic bearing such that the load carrying of the first journal bearing is not interfered with under most circumstances.

14. The integrated journal bearing of claim 13, wherein the controller is configured to control the magnetic force generated by the active magnetic bearing such that it provides variable and controllable stiffness and damping.

15. The integrated journal bearing of claim 13, wherein the controller is configured to control the magnetic force generated by the active magnetic bearing such that it compensates for instability from the journal bearing.

16. The integrated journal bearing of claim 13, wherein the controller is configured to control the magnetic force generated by the active magnetic bearing such that it compensates for shaft imbalance.

17. The integrated journal bearing of claim 13, wherein the controller is configured to control the magnetic force generated by the active magnetic bearing such that it compensates for disturbances acting on the shaft.

18. The integrated journal bearing of claim 1, wherein the electro-magnetic actuator is configured to provide passive damping.

19. The integrated journal bearing of claim 1, where the electro-magnetic actuator and the first journal bearing are axially adjacent along the shaft within the housing.

* * * * *